UNITED STATES PATENT OFFICE.

JOHN A. HUNTER, OF PHILADELPHIA, ASSIGNOR TO THE HUNTER STEEL COMPANY, OF CATASAUQUA, PENNSYLVANIA.

PROCESS OF CONVERTING IRON OR STEEL.

SPECIFICATION forming part of Letters Patent No. 498,061, dated May 23, 1893.

Application filed February 29, 1892. Serial No. 423,282. (No specimens.)

*To all whom it may concern:*

Be it known that I, JOHN A. HUNTER, a citizen of the United States, and a resident of Philadelphia, Pennsylvania, have invented certain Improvements in Processes of Converting Iron or Steel, of which the following is a specification.

The object of my invention is to convert mild steel or steel containing a low percentage of carbon into steel in which the carbon is present in higher percentage, so that it can be tempered and used for the manufacture of cutting tools, and for other purposes for which tempered steel is required.

The invention consists in subjecting the metal, while in a molten state, to a blast of chlorine, oxygen, and hydrogen, which gases are generated in the presence of or are brought into contact with heated carbon before entering the converter. The metal, present in a molten state in the converter, is therein subjected to the action of the gases, which may be introduced in the same way as the air blast of an ordinary Bessemer converter, the gases being generated in any suitable vessel in contact with the heated carbon, or being first generated and then brought into contact with the heated carbon before entering the converter, the length of time during which the blast must be continued being determined by experiment and being dependent upon the desired character of product.

In carrying out the invention, I prefer to heat together muriatic acid, commercial chloride of lime containing hypochlorite and carbon, such as wood charcoal, and to force the evolved gas through the molten charge in the converter, and salt may be added to the charge with good effect in some cases; one instance where the addition of salt is advantageous being where silicon is present in high percentage in the metal under treatment. The hypochlorous acid (HClO) resulting from the action of the muriatic acid upon the chloride of lime is disunited by contact with the heated carbon and the oxygen and hydrogen attack the carbon and carry a certain percentage of the same into the iron, the action being facilitated by the presence of the chlorine.

Having thus described my invention, I claim and desire to secure by Letters Patent—

1. The mode herein described of increasing the percentage of carbon in low steel, said mode consisting in subjecting the metal while in a molten state in a suitable converter, to the action of a blast of chlorine and oxygen, which have been brought into contact with heated carbon before entering the converter, substantially as specified.

2. The mode herein described of increasing the percentage of carbon in low steel, said mode consisting in subjecting the metal, while in a molten state in a suitable converter, to the action of a blast of chlorine, oxygen and hydrogen which have been brought into contact with heated carbon before entering the converter, substantially as specified.

3. The mode herein described of increasing the percentage of carbon in low steel, said mode consisting in subjecting the metal, while in a molten state in a suitable converter, to the action of a blast composed of the gases evolved from the action of muriatic acid upon chloride of lime, which gases have been brought into contact with heated carbon before entering the converter, substantially as specified.

4. The mode herein described of increasing the percentage of carbon in low steel, said mode consisting in subjecting the metal, while in a molten state in a suitable converter, to the action of a blast composed of the gases resulting from the heating together of muriatic acid, chloride of lime and carbon, substantially as specified.

5. The mode herein described of increasing the percentage of carbon in low steel, said mode consisting in subjecting the metal, while in a molten state in a suitable converter, to the action of a blast composed of the gases resulting from the heating together of muriatic acid, chloride of lime, carbon and salt, substantially as specified.

In testimony whereof I have signed my name to this specification in the presence of two subscribing witnesses.

JNO. A. HUNTER.

Witnesses:
EUGENE ELTERICH,
HARRY SMITH.